J. L. CREVELING.
METHOD OF OPERATING STORAGE BATTERIES, ETC.
APPLICATION FILED JULY 13, 1915. RENEWED JULY 15, 1921.
1,407,383.
Patented Feb. 21, 1922.
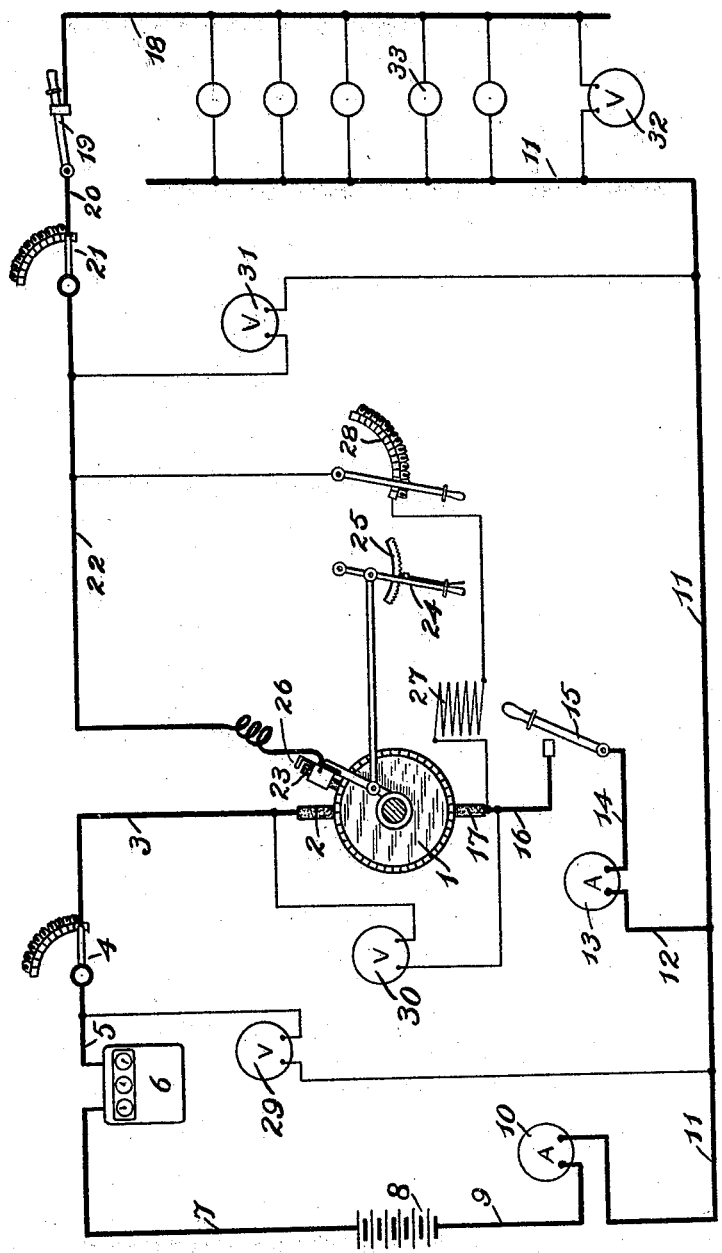
INVENTOR:
John L. Creveling

UNITED STATES PATENT OFFICE.

JOHN L. CREVELING, OF AUBURN, NEW YORK.

METHOD OF OPERATING STORAGE BATTERIES, ETC.

1,407,383.　　　　　Specification of Letters Patent.　　Patented Feb. 21, 1922.

Application filed July 13, 1915, Serial No. 39,614. Renewed July 15, 1921. Serial No. 485,021.

*To all whom it may concern:*

Be it known that I, JOHN L. CREVELING, a citizen of the United States, residing at Auburn, in the county of Cayuga and State of New York, have invented the new and useful Improvement in Methods of Operating Storage Batteries and Translating Devices in Co-Operation with a Controllable Source of Electrical Potential Difference, set forth in the annexed specification, wherein my invention is explained with reference to the annexed drawing, to add clearness in description by means of diagrammatic or schematic representation of certain qualities and quantities and examples of properties of instrumentalities and their mutual relations employed in practicing my invention.

My invention pertains to methods of charging and operating storage batteries and maintaining translating devices in co-operation with a source of electrical potential difference, and pertains more particularly to such methods wherein the value of the potential difference at said source tends to vary and may be controlled. The drawing is a diagrammatic or schematic representation portraying various quantities, qualities and instrumentalities which, independent of any particular type or kind, may be used in practicing my method, provided they fulfill the functions given thereto in the description of my invention.

In the drawing, the source of electrical potential difference from which the system is supplied is diagrammatically portrayed as a generator provided with the commutator 1, having the positive brush 2 in operative relation thereto, from which the wire 3 is carried to any suitable type of regulating device indicated at 4 as an ordinary manually-operated rheostat, for the purpose of indicating some kind of a regulator, merely.

From the other terminal of the device or mere regulating quality or quantity 4 the wire 5 is led to one terminal of any suitable metering mechanism or quantitative measuring device 6, in this instance diagrammatically indicated as an ordinary electric meter, having its remaining terminal connected as by wire 7 with the positive terminal of the storage battery 8, the negative of which is connected as by means of wire 9 with one side of a current flow measuring device 10, which may be an ordinary ammeter, having its remaining terminal connected with the wire 11, which is in electrical connection with the wire 12 which leads to one side of ammeter 13, the opposite side of which is connected as by wire 14 with one terminal of the switch 15, the remaining terminal of said switch being connected as by wire 16 with the negative brush 17 in operative relation to the commutator 1.

The wire 11 has also in connection therewith the translating devices indicated at 33, the opposite terminals of which are connected with the wire 18 which is electrically connected with the wire 20 through the switch 19, when desired. The wire 20 is connected with the wire 22 through any suitable type of instrumentality possessing the quality necessary to regulate the voltage upon the translating devices, and in this instance is indicated diagrammatically as an ordinary manually-operated rheostat. The wire 22 is connected, as by means of the flexible conductor shown, with any suitable kind of contact device or brush indicated at 23, which is capable of being moved to various points upon the surface of commutator 1 so as to maintain a difference of potential between brushes 23 and 17 equal to the difference of potential between brushes 17 and 2, or a lesser amount as the position of brush 23 is brought nearer to brush 17, as will be understood by those skilled in the art.

The position of the contacting device or brush 23 may be determined and maintained by operation of a lever indicated at 24, which may be held in fixed positions if desired, as by means of the common latch and segment device indicated at 25. The commutator 1 is preferably of sufficient length that brushes 2 and 23 may have their axes in the same radial plane when such adjustment is desired. And if desired, any suitable contacting device as indicated at 26 may be provided, so that when the said brushes are in the same plane they may be electrically connected with each other at or beyond the extremities farthest from the commutator face, for a purpose which will hereinafter more clearly appear. The type of generator chosen to indicate the source of electrical potential difference is, for sake of simplicity, taken as a plain shunt machine provided with the field coil 27 having in series therewith a manually-operated regulating rheostat indicated at 28, merely for the purpose of indicating something possessed of the proper qualities for regulating or controlling the source of electrical potential difference.

29 represents a voltmeter across the battery circuit which may be used, if desired, to show the potential difference across said circuit. 30 is a voltmeter across the generator which may be used to indicate at any time the maximum generator voltage, if desired. 31 is a voltmeter across the circuit supplying the translating devices, and may be used, if desired, to indicate the voltage on the generator side of the translation circuit regulating quantity 21. 32 is a voltmeter which may be used, if desired, to show the voltage upon the translating devices.

My invention comprehends the following mode of operation which is given as one mode of operation falling within the same, for the purpose of describing one way in which my invention may be used.

Presuming that the various qualities necessary for the performance of my method are possessed by the instrumentalities indicated in the schematic or diagrammatic representation, or that, for sake of example merely, we impose upon the instrumentalities diagrammatically portrayed therein the functions hereinafter set forth, then and in that event the process or method may be carried out as follows:

Starting, for example, with the source of electrical potential difference as ineffective, zero or inoperative with respect to the other qualities and quantities portrayed, as, for example, when we consider the source to be a generator, as we have for example in this case, and the same has its armature stationary, then current will flow from the battery 8 through wire 7, meter 6, wire 5, regulator 4, wire 3, brush 2, a portion of commutator 1, and windings of the armature (not shown), and thence back through the commutator to brush 23, provided the said brush be in the position indicated in the diagram, which, however, would be an abnormal position for the said brush 23 under these conditions, but is chosen in this part of the description for sake of clearness in illustration, as will hereinafter more plainly appear. From the brush 23 current will flow through wire 22, regulating device 21, wire 20, switch 19, if the same be closed, and wire 18 to the translating devices 33, which of course may be of any desired character. From the translating devices return is made through the wire 11, through ammeter 10, if desired, and wire 9 to the battery. Under these conditions the amount of current discharged by the battery in ampere hours may be registered by the meter 6, and the rate of current discharged by the battery,—that is, the amperes at any given moment, will be indicated by the ammeter 10, while the voltage across the battery under these conditions may be ascertained at any particular time by observing the voltmeter 29. No current will be wasted by back discharge through the switch 15 so long as the same remain open, in which position it should be during these assumed conditions.

And, under the above conditions, I preferably swing the lever 24 in such direction as to revolve the brush 23 in a counter clockwise direction into the same plane and resting upon the same commutator bars as the brush 2, in which position the contact 26 may engage the wire 3 and short-circuit the path through the brushes 2 and 23, and thereby avoid the necessity of the current furnished by the battery 8 to the translating devices traversing any of the armature windings, or even the brushes. The voltage across the circuit through which the generator may supply the translating devices, and between the source and the regulating device 21, may be observed at any time by means of voltmeter 31; while the voltage impressed upon the translation circuit, modified, if the same may be by use of the regulator 21, is observable at any time by consulting voltmeter 32.

With the battery supplying the translating devices as above explained, if its voltage be above that desired upon the translating devices, the translating circuit voltage may be readily decreased or regulated through the instrumentality of either the regulating device 4 or the regulating device 21, in this instance diagrammatically portrayed as ordinary manually-operated rheostats. It is usual where a storage battery and translating devices are used together, as in this example chosen for description, to select translating devices the normal operating voltage of which is substantially, if not exactly, the normal working voltage of the storage battery, so that throughout the greater portion of a cycle of discharge of the battery to the translating devices the said devices are supplied with but little regulating opposition or resistance, as at 4 or 21, and thus little loss of energy is dissipated for the mere purpose of regulation.

With such an arrangement, however, if the battery be of the usual lead-sulphuric acid type, for example, it will, when in a fully charged condition, have at times a voltage across its terminals far in excess of this normal working voltage, and under some conditions even 25% excess, to which reference will later be made.

If now the value of potential difference at the source, as indicated by voltmeter 30, be raised to such value that it is substantially equal or slightly in excess of the voltage across the battery circuit, as indicated at 29, and if switch 15 be closed, current will be supplied from the source and will flow through brushes 2 and 23 (it being remembered that the said brushes have above been considered as standing in the same radial plane), and the source will supply at least some of the current to the translating devices 33. And, if the potential difference at the source be sufficiently raised, as by increasing the speed of the generator armature, the translating devices will not only be entirely supplied from the said source, but current will flow from the source through the storage battery 8 to charge the same in a well known manner. Under these conditions, if the potential difference across the source be sufficiently in excess of the normal discharge voltage of the battery 8, the battery may receive a charging current at the maximum desired rate, as indicated by the ammeter 10, and the current in ampere hours supplied to the battery may be registered by the meter 6. If the voltage across the source be sufficient that it tends to force a higher charging current through the battery 8 than is desired, this rate might of course be regulated or lessened by regulating resistance 4. However, this would necessitate a loss of energy dissipated in the resistance 4 for the mere purpose of regulation, which my invention makes to avoid.

Further, with the two brushes 2 and 23 understood as resting upon the commutator in the same radial plane, the voltage across the circuit indicated by voltmeter 31 will be substantially the same as that across the source as indicated by voltmeter 30, and, as above assumed, sufficiently in excess of the desired translation circuit voltage to charge the battery. Of course the voltage upon the translation circuit could be regulated under these conditions by means of the resistance or other regulating device indicated at 21, but such regulating device, in producing a drop in potential for the mere purpose of regulating the translating circuit, would necessitate a waste of energy, toward which my method makes to avoid. As, during the above outlined operation wherein the battery and the translating devices are both receiving current from the source it has been pointed out that a higher potential difference is necessary across the battery in order to force a charging current through the same than is desired across the translating devices which at times have to depend upon the battery, I therefore, under these conditions, move the lever 24 so as to swing the brush 23 in a clockwise direction which will break the connection between the wires 3 and 22 as may be established at 26, and impress a lower voltage upon the circuit whose voltage is indicated at 31 than upon the battery charging circuit.

And, I move the brush 23, as above outlined, to such a distance from the brush 2 that the desired difference of potential is maintained upon the translating devices with little, if any, loss taking place in the regulating device 21, and the desired difference of potential is maintained across the battery 8 with little, if any, regulating loss taking place in the instrumentality 4 and, I so regulate the source of electrical potential difference that it will maintain these voltages for which I have made the above adjustments and arrangements by regulating the device, indicated as a manually-operated rheostat 28, controlling the field excitation of the generator herein chosen to exemplify a source.

Now, if the speed of the generator increase, say even to double or triple its assumed operating speed at which it has been supplying both the battery and translating devices, I simply watch the voltmeter 31 and hold the desired voltage across its circuit by proper manipulation of the regulator 28, and then, throughout all these wide changes in speed of the generator, or tendencies of the electrical potential difference at the source to vary, the battery and translating devices will continue to have impressed upon the same the chosen voltages above pointed out.

Further, throughout all the operation above it will be noted that if at any time the total output of the generator tends to exceed a desired maximum, as for example, its safe carrying capacity indicated in amperes as by the ammeter 13, I may readily prevent this desired maximum from being exceeded by properly manipulating the regulator 28.

Or, if the maximum current tending to flow through the storage battery at any time, as indicated by the ammeter 10, tend to exceed a desired maximum charging rate, I may readily reduce this charging current either by manipulating the regulator 4 or properly manipulating the regulator 28. And, in the latter case, if this regulation tend to reduce the voltage upon the translating devices below that desired, I may, within limits, readily bring the same to the normal by moving brush 23 toward brush 2, and thus increase the potential upon the translating circuit, notwithstanding the potential upon the battery charging circuit has been somewhat lessened.

If now, while running under any of the above conditions, the potential difference at the source decrease, as, for example, suppose the generator herein considered as the source to have its speed reduced, I can within limits, regulate for said reduction by so manipulating the regulator 28 as to increase the field excitation. If then the generator speed fall until the potential difference across brushes 17 and 23 is less than that desired upon the translating circuit and if the potential difference across brushes 17 and 2 be in excess of the counter electromotive-force of the battery 8, I swing the lever 24 so as to move the brush 23 in a counter clockwise direction and increase the potential upon the translating circuit which I may hold at its maximum desired quantity in this manner so long as the maximum voltage of the generator across brushes 2 and 17 is equal to or above the counter electromotive-force of the battery. However, as soon as the potential difference across 17 and 2 is less than that of the battery, the battery tends to discharge through the generator, and I open the switch 15 and prevent this back discharge or waste of energy and move the brush 23 into the same plane as the brush 2 and cause the connecting device 26 to short-circuit the brushes, as described early in this specification. And since throughout part of this operation the voltage as indicated by voltmeter 31 may be higher than that desired upon the translating devices, as indicated by voltmeter 32, owing to the fact that the battery 8, which we have presumed to have been receiving charging current, may have its voltage raised above its normal discharge voltage, which we have selected as the voltage desired upon the translating devices, I so manipulate the regulator 21 throughout this period as to hold constant voltage upon the translating devices 33. Or, if desired, throughout this interval it might be equally easy to perform such regulation by the regulator indicated at 4, as will be obvious to those skilled in the art. With the translation circuit fed from the storage battery and no current supplied from the source, the voltage across the battery will usually quickly drop to its normal operating voltage and the regulator 21 may thus serve to hold the constant desired potential upon the translating devices with appreciable loss for only a short time for the purpose of regulation, and then a negligible loss will be sustained.

Further, it will be noted that at any time when charging the battery as above outlined and maintaining the translating devices from the source of electrical potential difference, if the battery become sufficiently charged that it is desirable to discontinue charging the same, this may be readily done by reducing the difference in potential across the brushes 2 and 23 by bringing them closer together and simultaneously properly maniplating the resistance 28 in such manner that the desired voltage may be held upon the circuit indicated by the voltmeter 31, and as small an excess as desirable may be held across the battery circuit which excess above the voltage indicated at 31 may be so small as to prevent charging the battery. Of course, the determination as to when it is desired to reduce or discontinue the battery charge may readily be made by observing the ampere hours charge indicated by the meter 6; or the ampere rate of charge as indicated by ammeter 10 for a given length of time; or even by taking the specific gravity of the electrolyte of the battery; or even by an optical observation of the color of the battery plates; or any of the various widely known criteria employed by those understanding or operating batteries.

However, if the voltage upon the circuit measured by voltmeter 31 be held constant, as by means of regulator 28, and the proper value has been chosen for the potential difference between brush 2 and brush 23, as by selecting the proper position for brush 23, then, as the battery becomes charged until its voltage rises, the charging current will automatically taper off and be reduced to practically nil when the battery becomes fully charged.

It will be noted that I have shown a rather free distribution of voltmeters and ammeters, which has been done merely to show how they may be employed in the performance of my method, while they may all be dispensed with, provided the person employing my method have some other way of determining the qualities and quantities desired, and which I have exemplified as measured by these various instruments.

From the foregoing, it will be noted that I have invented a method of utilizing storage batteries, translating devices, and a source of electrical potential difference whereby the batteries may be charged even to their highest desired voltage, and the translating devices simultaneously operated from said source with small losses for the purpose of regulation; and that my method provides for these conditions even under widely varying tendencies of the controllable source of electrical potential difference to vary.

I do not wish in any way to limit myself to any of the exact operations or modes of operation detailed above for the mere purpose of providing an example of use of my invention, for it will be obvious that widely differing operations may still be within the scope and spirit of my invention, which is as set forth in the following claims, and independently of any types of instruments, apparatus or devices used in performing the functions specified in said claims.

I claim:

1. The method of utilizing storage batteries and translating devices in co-operation with a controllable source of electrical potential difference, comprehending charging a storage battery and operating translating devices from said source at different values of electrical potential difference derived therefrom, controlling said source in response to tendencies toward fluctuations in the value of the translating electrical potential difference and controlling the charging of the battery by varying the difference between the values of electrical potential difference derived from said source.

2. The method of utilizing a storage battery and translating devices in co-operation with a source of electrical potential difference tending to vary, comprehending supplying current to the battery and to the translating devices from said source at different values of electrical potential difference, compensating for tendencies in said source to vary and lowering the electrical potential difference at said source when desired to cease charging the battery.

3. The method of utilizing a storage battery and translating devices in co-operation with a controllable source of electrical potential difference tending to vary, comprehending supplying current to the battery from said source, supplying current to the translating devices at a lower potential difference from said source and controlling the electrical potential differences supplied by said source in accordance with fluctuations tending to take place in the value of the lower of said electrical potential differences.

4. The method of utilizing a storage battery and translating devices in co-operation with a controllable source of electrical potential difference tending to vary, comprehending supplying current to a battery from said source, supplying current to translating devices at a lower electrical potential difference from said source, controlling the electrical potential differences supplied by said source in accordance with fluctuations tending to take place in the lower value of electrical potential differences and controlling the charging of the battery by varying the value of the difference between said electrical potential differences.

5. The method of utilizing storage batteries and translating devices in cooperation with the controllable source of electrical potential difference subject to tendency to vary comprehending charging a storage battery and operating translating devices at different values of electrical potential difference derived from said source and controlling said source in response to tendencies toward fluctuations in the lower potential difference utilized and regulating the current supplied to the battery by varying the difference between the aforesaid potential differences at the source.

JOHN L. CREVELING.